Jan. 3, 1967 M. J. WAITE ETAL 3,296,412

VERTICAL WELDING OF ALUMINUM

Filed Jan. 8, 1964 2 Sheets-Sheet 1

INVENTORS
MATT J. WAITE
THOMAS MOORE
BY
ATTORNEYS

INVENTORS
MATT J. WAITE
THOMAS MOORE
BY
ATTORNEYS

3,296,412
VERTICAL WELDING OF ALUMINUM
Matthew J. Waite, Philadelphia, Pa., and Thomas J. Moore, Cleveland, Ohio, assignors to Arcos Corporation, Philadelphia, Pa., a corporation of Pennsylvania
Filed Jan. 8, 1964, Ser. No. 336,506
6 Claims. (Cl. 219—126)

The present invention relates to electric welding of vertical seams in aluminum base alloy plates.

A purpose of the invention is to make an enclosed weld in a vertical groove of aluminum base alloy plates of ½″ thickness or greater with increased efficiency and reduced heat loss by employing a shallow weld pool confined by shoes which extend only as deep as the molten pool, not over one inch but preferably ½″ below the top of the weld pool, and to quench the weld metal in the plates below the shoes by a fluid such as water so as to maintain an adequately low temperture in the newly formed weld bead.

A further purpose is to control the application of quenching by sensing the temperature of the weld-deposited metal.

A further purpose is to use large aluminum electrodes having a cross section of ⁹⁄₆₄″ or larger so as to effectively employ large welding currents of 300 to 1,000 amperes or more, so as to avoid excessive heat losses and obtain a high rate of weld deposition.

A further purpose is to utilize roller shoes which may permissibly have flats on the sides.

A further purpose is to utilize metallic belts as shoes.

A further purpose is to use materials of high melting points for the shoes, for example refractory oxides such as magnesia and alumina, and refractory metals such as tungsten.

Further purposes appear in the specification and in the claims.

In the drawings we have chosen to illustrate a few only of the numerous embodiments in which the invention may appear, selecting the forms shown from the standpoints of convenience in illustration, satisfactory operation and clear demonstration of the principles involved.

Figure 1:
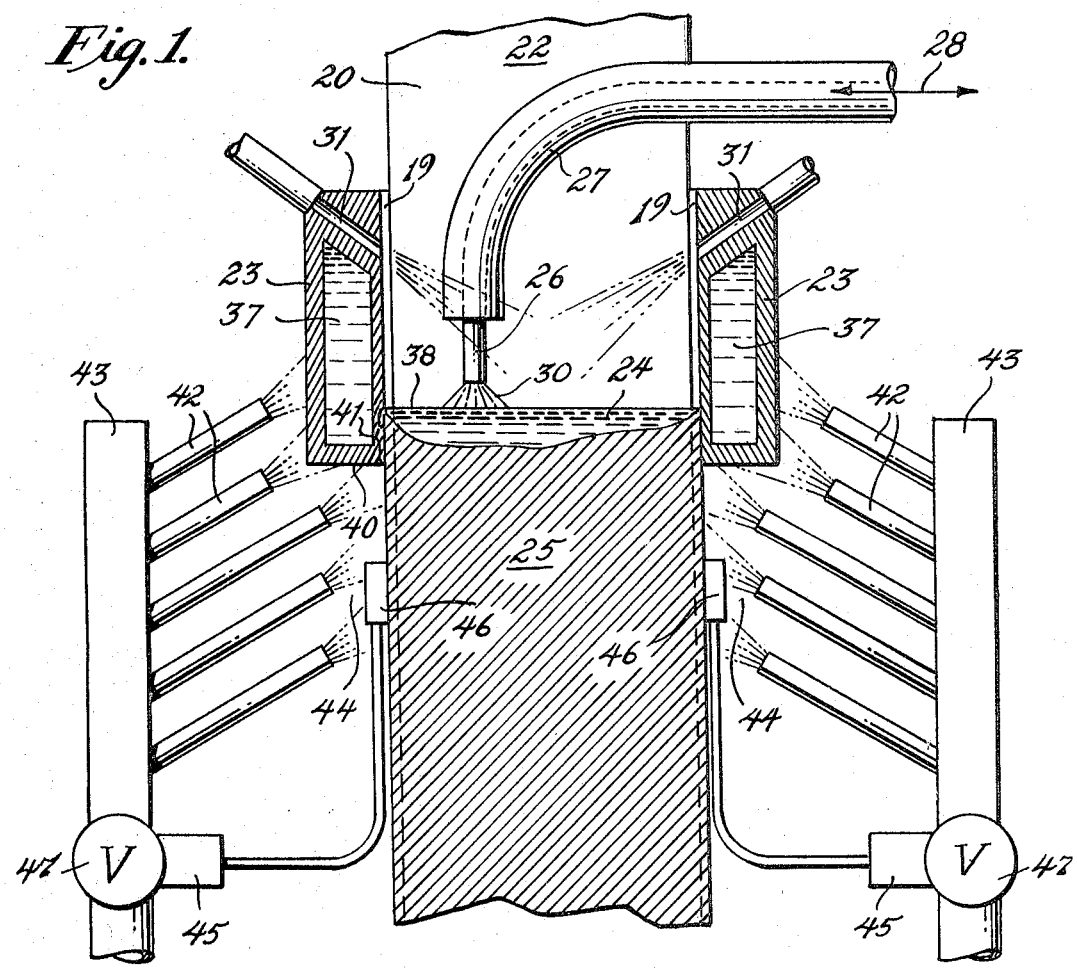
FIGURE 1 is a vertical section through the newly formed weld, the weld pool and the weld groove between the plates which are being welded.

Describing in illustration but not in limitation and referring to the drawings:

Extensive use is being made of enclosed welding techniques in steel for welding vertical joints between steel plates. In the case of steel such welding is relatively easy because of the low heat conductivity of the base metal. In good practice at least 75% of the electrical energy developed is usefully applied in welding, the rest being dissipated in heat without actually causing any benefit from the standpoint of welding.

Steel is also a rather simple problem from a metallurgical standpoint, since rapid solidification of the metal in the weld pool is ordinarily not essential to obtain good metallurgical properties in the weld.

Aluminum base alloys present unusual difficulties which are not met in steel welding. The heat conductivity of pure aluminum and of the commercially used aluminum base alloys is so high compared with steel that even in good practice only about 50% of the heat developed electrically may be usefully employed in welding, the rest being dissipated in the base metal.

The metallurgical problem in aluminum is also much more difficult. Rapid solidification in aluminum is much more important than steel, since failure to obtain rapid solidification is likely to lead to low strength, poor ductility, high notch sensitivity or low corrosion resistance. The presence of large dendrites in the weld metal must above all be avoided.

The problem in aluminum alloys is further increased where the alloys are heat treatable by age hardening or other techniques. In modern heat treatable aluminum base alloys magnesium silicide is commonly dispersed for age hardening purposes and this compound must be very uniformly distributed in very fine particles. The formation of large dendrites would cause large crystals of silicon or segregation of other alloying elements.

Where the aluminum alloy contains significant quantities of copper, zinc or combinations of the same, similar conditions exist.

The aluminum base magnesium bearing alloys, commonly containing contents of magnesium up to about 6% or somewhat higher, are very susceptible also to intercrystalline corrosion if there is any appreciable segregation and control of the cooling rate of the weld may therefore be very important if corrosion resistance in the weld metal is to be obtained.

It should further be kept in mind that there are serious limitations on the current which can be used in normal inert gas (Mig) welding. In the prior art the maximum current limit is of the order of 450 amperes regardless of the size of aluminum electrode, unless special trailing shield is employed. This limitation is imposed by the danger of contamination of the exposed liquid weld metal trailing behind the arc. Each increase in amperage lengthens the weld pool because of the accompanying increase in welding travel speed, ultimately exposing the solidification front to the ambient atmosphere outside the inert gas shield around the electrode. Thus for ¹⁄₁₆″ diameter electrode the upper limit of usable current in the prior art has been about 390 amperes; for ³⁄₃₂″ electrode the current used is 350 to about 425 amperes, and an absolute barrier has been made at about 450 amperes. With a ⅛″ diameter electrode it is not possible to establish a stable arc of spray type below the current barrier imposed by the shielding problem. The current ranges which are recommended by the American Welding Society in the Welding Handbook, Section IV, Table 69A.13 include the following values suggested for welding ¾″ thick aluminum plate:

| Electrode diameter, in inches: | D.C. amperes |
|---|---|
| ³⁄₃₂ | 340–440 |
| ¹⁄₁₆ | 270–375 |

The problem faced by the present invention is primarily exhibited in plates which have very substantial thickness, of the order of ½″ or thicker extending to thicknesses of many inches. In a typical application the techniques of the invention are likely to be employed in welds of plates having thicknesses of ½″ to 10″.

In accordance with the invention, enclosed welding practice is used. The weld pool is confined by shoes which engage the plates on opposite sides of the weld groove and which move up as the weld progresses. For metallurgical reasons particularly it is important that the weld pool be quite shallow, though it should extend across from shoe to shoe so as to avoid the danger of cold shuts.

Proceeding exactly contrary to what one would think would be desirable because of the high conductivity of aluminum in order to obtain reasonable efficiency in utilization of heat, we find that it is very important that the shoes extend only a short distance below the top of the weld pool and that the weld metal and adjoining edges of the plates be actually quenched so as to limit the depth of the weld pool and avoid excessive temperatures in the base metal and excessive remelt of the base metal.

Accordingly the weld shoes extend only a maximum of the depth of the molten pool, not over one inch, but preferably only about ½" below the top of the weld pool. A cooling medium, preferably water, is sprayed on the solidified weld metal immediately below the shoes and preferably also on the sides of the shoes.

We find that it is important also to utilize a high weld current, in the range between 300 and 1,000 amperes or more, and using either one electrode or a plurality of electrodes. Good results have been obtained with welding currents in the range of 450 amperes to 600 amperes. This is a complete departure from prior art practice and transcends the current barrier previously encountered. The welding voltage is suitably in a range between 24 and 40 volts depending on the shielding gas.

In line with the use of a high welding current, it is decidedly preferable to use a welding electrode larger than ⅛". Thus welding electrode diameters of %4", %2", %6", %2" and larger are recommended.

The electrode in many cases will have the same composition as the base metal although it may be somewhat higher in critical alloying ingredients where desired. A solid welding electrode will often be used, although the welding electrode may also if desired have an internal flux core containing a suitable flux, preferably an alkali metal halide, such as sodium chloride, potassium chloride or lithium fluoride.

Welding may be carried out either with direct current or with alternating current. In the case of direct current, reverse polarity is preferred, although straight polarity may be used if desired.

The protecting gas used will preferably be helium, argon or a mixture of helium and argon in any desired proportions. Helium or argon or mixtures thereof may also be used in admixtures with other shielding gases as normally used in shielded gas welding of aluminum. The gas can be introduced either through the shoes or by a snorkel attachment or by a combination of these means as well known in the art.

High rates of deposition of metal are obtained by the invention, a typical deposition being in the range between 6 and 20 pounds per hour.

The plates may be preheated especially in the local area where the weld is started, if desired, suitably to temperatures of the order of 300° F. to 400° F. as well known in the art.

In normal welding as known in the art the use of high welding currents in one-pass welding such as we propose would lead to increased temperatures of the aluminum base alloy plate as the weld progresses and the heat builds up. For this reason the welding current would have to be reduced as the weld progressed, unless the heat build-up is controlled by quenching. Quenching permits higher starting and operating currents and consequently higher weld deposition rates. Under these controlled conditions the weld is accomplished at greater economy and with higher quality.

In accordance with the invention it is not possible to use multiple pass welding as would normally be the case in welding thick plates. Everything is done in a single pass. The process of the invention nevertheless avoids excessive heat build-up which would prevent the difficulties previously referred to.

It will be, of course, evident that a certain amount of remelting of solidified metal may take place in the weld pool as the electrode is reciprocated from side to side toward one shoe or the other, but there should always be a continuous pool at the top from shoe to shoe.

It will further be evident that an advantage of the invention is the avoidance of distortion and excessive residual stress in the weld and in the base metal.

Referring to the form of FIGURE 1, we there illustrate two vertical plates 20 and 21 (only one of which is there shown) which are aligned in abutting relationship with a vertical weld groove 22 between the ends of the plates.

Shoes 23 on opposite sides, suitably of copper, in this form extend across from one plate to the other and confine a weld pool 24 on the top of the upwardly forming weld 25. The shoes are desirably recessed at 19 opposite the weld so as to provide a reinforcement of the weld profile as shown.

An electrode 26 is introduced into electrical heating relation with the weld pool 24, coming down from above through a suitable guide and electric contact tube 27 of well known type which is desirably reciprocated back and forth horizontally in the direction transverse to the plane of the center of the plates as suggested by the arrows 28 using equipment well known in the art.

While a single electrode is shown, it will be evident that electrodes may be arranged in groups or pairs as desired. A fluxing or slagging material may be used to prevent adhesion of the shoes to the weld.

The electrode may be a solid electrode and will suitably maintain an arc 30 to the surface of the weld pool, although where flux is present floating on the weld pool the arc may be submerged by the slag, and also where a heavy layer of slag is used heating may be by the electroslag and resistance technique, in which case resistance heating occurs in the slag to melt the weld pool, as well known.

If flux is to be employed, while it can be introduced separately as in submerged arc welding, it will preferably be introduced by using a flux cored electrode wire of the continuous type as well known.

Gas in introduced into the space above the weld pool, desirably either helium or argon or a mixture thereof. In FIGURE 1, we show gas ports 31 in the shoes on opposite sides blowing gas into the vicinity of the arc and on top of the molten metal to protect the same.

Figure 2:
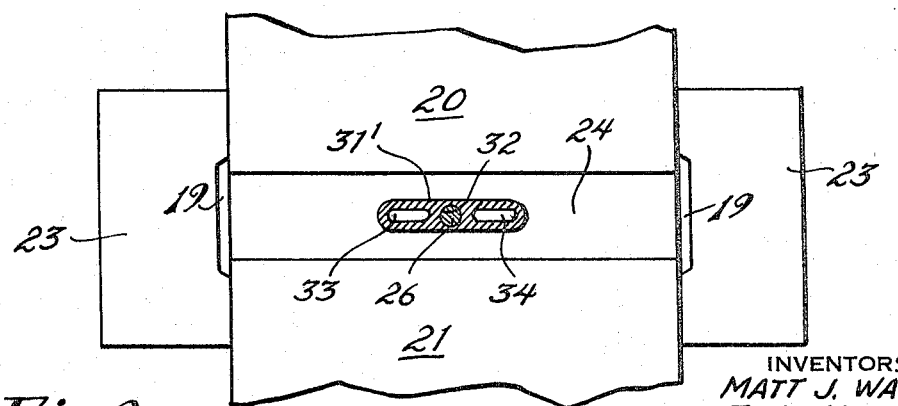
FIGURE 2 is a diagrammatic top plan view of a weld according to the invention showing a variation in the means for introducing the gas.

While gas is desirably introduced through the shoes as shown, gas may be introduced by what is known in the trade as a snorkel 31'. In this case as best shown in FIGURE 2, the guide tube is elongated in the direction of the thickness of the plates and has one or more center openings 32 through which electrodes 26 are guided and by which electrical contact to the electrodes is made. The snorkel tube 31' also has gas ports 33 and 34 suitably of elongated cross section, one on either side of the electrode and blowing gas down into the vicinity of the arc to form gas jets 35 and 36 which protect the surface of the weld metal. This method of shielding the arc is particularly effective when the snorkel approaches close to the shoes, thus otherwise disturbing the gas flow and gas shield provided through the shoes.

The shoes 23 shown in FIGURE 1 are desirably water cooled as by providing interior water circulating passages 37 to which water is introduced and from which it is withdrawn by means not shown.

The distance between the top 38 of the weld pool and the bottom of the shoes at 40, as shown at 41 is comparatively short not in excess of the depth of the molten pool, not over one inch. Immediately below the shoes and designed to spray a cooling liquid, suitably water, on the weld 25 and also suitably on the outside of the shoes are spray nozzles 42 mounted on headers 43 and providing water sprays 44.

In some cases it will be desirable to maintain a suitable preheat in the base metal and where this is important it may be desired to have the base metal held within a maximum and minimum temperature at a predetermined point slightly below the weld pool. For example, in a particular case a suitable temperature might be 250–350° F. at a point 1.2 inches below the top of the weld pool.

This may be done based on experience in the operation by turning the water jets off at the beginning of the weld until substantial heat is built up and then turning them on as the temperature in the weld and the base metal tends to become excessive. This also may be done automatically for example by providing an automatic pyrometer 45 of any well known type which has a sensing element 46 in contact with a point on the weld below the weld pool where temperature can be measured. The pyrometer according to mechanism well known in the art opens or closes and controls a valve 47 through which the water is introduced to the water jets 44 so that the quantity of water is increased as the temperature rises objectionably in the previous weld and the base metal.

While sliding copper shoes are in many cases desirable, it will be understood that shoes of other materials such as graphite, cermet, nonmetallic refractory, or any suitable metals having other configurations, may be used as desired.

Stainless steel belts have been used in the prior art to contain molten aluminum weld metal in vertical welding, the belts being coated with a high temperature resistant paint such as magnesia bonded by sodium silicate. Such a coating is desirable in the present instance as otherwise a rough surface may be imparted to the welds.

Figure 3:
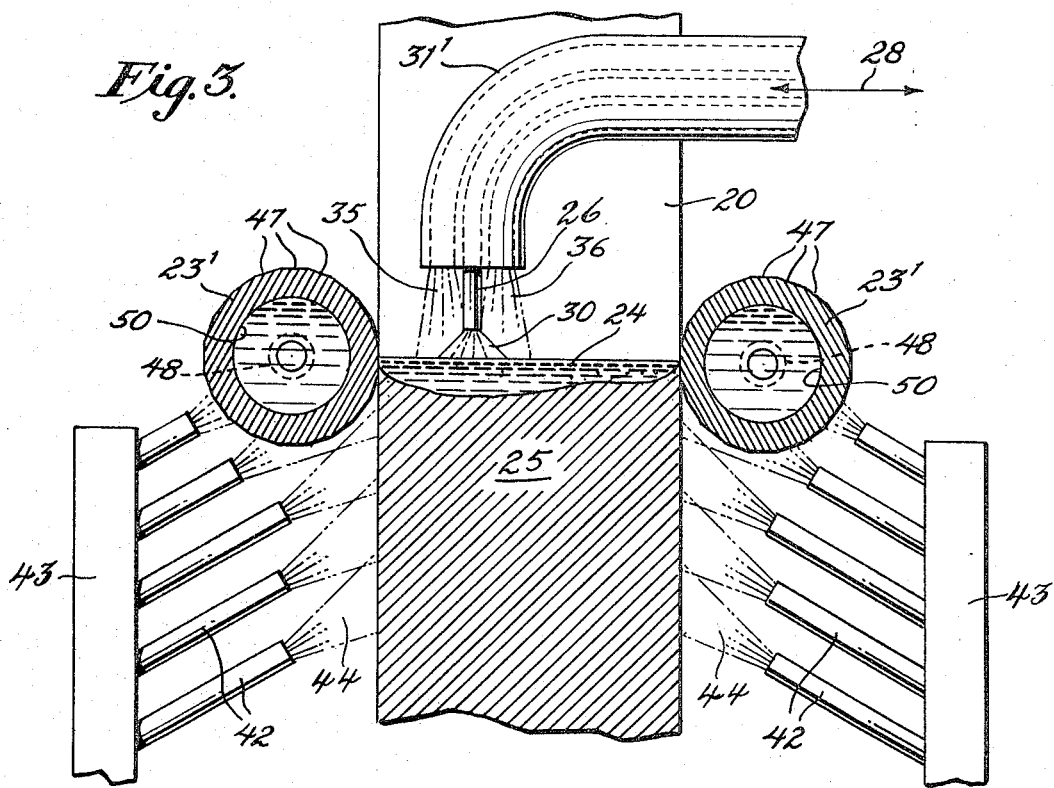
FIGURE 3 is a view corresponding to FIGURE 1 showing the use of roller shoes.

In FIGURE 3, shoes 23' are shown which are rollers suitably of copper and desirably provided with numerous flat surfaces 47 to better confine the weld pool at the sides. The shoes turn on pivots 48 at the ends which are suitably resilient so as to allow the high points of the surfaces to pass during rotation and the shoes move up progressively with the welding equipment as the weld advances. The shoes may conveniently be provided with a hollow interior 59 for water cooling, the water being introduced and withdrawn in any well known manner through the pivots at the ends.

Figure 4:
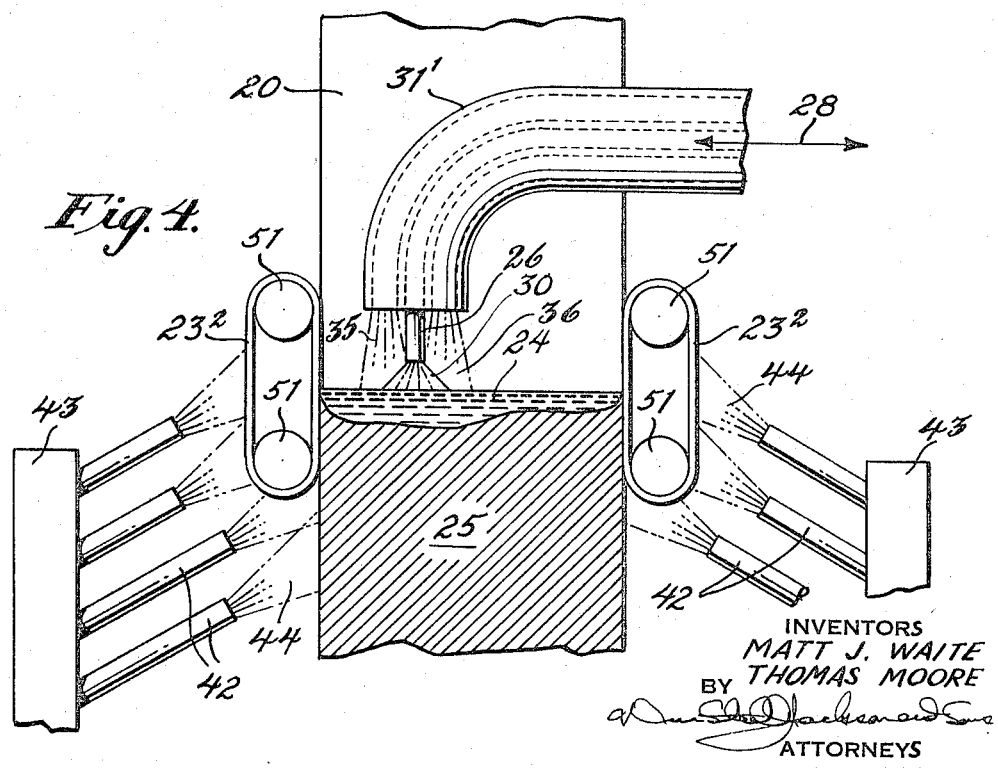
FIGURE 4 is a view similar to FIGURE 1 showing the use of belts as shoes.

In some cases it is desirable to use shoes of belt form as shown at 23² in FIGURE 4. These shoes are desirably made of stainless steel belts which are mounted in well known manner on idler pulleys 51 at the ends, the belts tending to advance as the shoes move upwardly with the the welding machine.

The device of the invention offers a number of advantages over older techniques of making vertical welds in aluminum base alloy plates.

The operation is very economical both from the standpoint of materials, power and labor and also from the standpoint of utilization of shop space, since the welding is performed with great rapidity.

High deposition rates are obtained and using well known techniques globular transfer of weld metal is preferably obtained by adjusting the current and using an electrode size to suit.

The large electrode size aids large deposition at high amperage.

Edge melting of the plates is kept to a minimum.

The consumption of shielding gas is moderate because of the high speed of welding.

Welds can be obtained which are free from porosity, which is constantly a difficulty when a non-consumable electrode is used. Welding parameters can be maintained within close limits so that weld quality is controlled and repetitive welds can be made with uniformity.

Typical aluminum alloys which can be effectively welded using the process of the present invention are as follows:

*Example I*

In one example welding 1½″ thick plates of aluminum alloy 5456 with a ¾″ groove between the plates, using a ⅛ inch or ⁵⁄₃₂ inch solid electrode wire of aluminum alloy 5556, 60 cubic feet per hour (at standard conditions) of argon is employed. The voltage is 28 volts and the current is 500 amperes, the power source is D.C. reverse polarity constant potential. Sound welds can be obtained using a vertical welding speed of 1.7 inches per minute.

*Example II*

Using the procedure of Example I except as noted below, plates of aluminum alloy 6061 may be welded to produce sound welds using Type 4043 aluminum electrode wire, under argon gas supplied at 65 cubic feet per hour, welding current being 475 amperes at 28 volts D.C. reverse polarity constant potential.

*Example III*

Using the procedure otherwise as set forth in Example I plates of aluminum alloy 5083 are successfully welded to produce sound welds using aluminum electrode wire Type 5183 with a flow of argon gas of 65 cubic feet per hour, a current of 525 amperes, and a voltage of 30 volts D.C. reverse polarity constant potential.

In view of our invention and disclosure variations and modifications to meet individual whim or particular need will doubtless become evident to others skilled in the art, to obtain all or part of the benefits of our invention without copying the process and apparatus shown, and we therefore claim all such insofar as they fall within the reasonable spirit and scope of our claim.

Having thus described our invention, what we claim as new and desire to secure by Letters Patent is:

1. The process of vertical welding of aluminum base alloy plates, which comprises positioning aluminum base alloy plates having a thickness in excess of ½ inch in spaced relation vertically to form a vertical weld groove, discharging electric current from an aluminum electrode to the base metal in the groove to form a weld pool, defining the weld pool at the edges by shoes which engage the plates, moving the shoes upwardly with the weld so that the bottom of the shoes are always within one inch of the top of the weld pool, quenching the newly formed weld and the plates immediately below the shoes by a fluid medium and protecting the weld by a gas of a class consisting of argon, helium and mixtures thereof.

2. The process of claim 1, in which the electrode is of a diameter of ⁹⁄₆₄ inch or larger.

3. The process of claim 1, in which the current in the electric discharge is in the range between 300 and 1,000 amperes.

4. The process of claim 1, which comprises maintaining the shoes in rolling contact with the weld pool and the sides of the plates.

5. The process of claim 4, which comprises providing flats on the shoes and maintaining said flat surfaces in rolling contact with the weld pool and the sides of the plates.

6. The process of claim 1, in which the shoes comprise endless belts and the endless belts are maintained in contact with the sides of the plates.

References Cited by the Examiner

UNITED STATES PATENTS

| | | | |
|---|---|---|---|
| 2,395,723 | 2/1946 | Chmielewski | 219—126 X |
| 2,805,321 | 9/1957 | Cadwell | 219—126 |
| 2,817,748 | 12/1957 | Meyer | 219—126 |
| 3,047,713 | 7/1962 | Liptak | 219—118 |

JOSEPH V. TRUHE, *Primary Examiner.*